United States Patent [19]
Dunlap et al.

[11] 3,755,212
[45] Aug. 28, 1973

[54] AIR BLOWN POLYURETHANE FOAMS
[75] Inventors: James R. Dunlap; Donald B. Parrish, both of Lake Jackson, Tex.
[73] Assignee: The Dow Chemical Company, Midland, Mich.
[22] Filed: May 13, 1971
[21] Appl. No.: 143,230

[52] U.S. Cl. 260/2.5 BD, 260/2.5 AN, 260/2.5 AV, 260/2.5 AF
[51] Int. Cl. ............ C08g 22/44, C08g 22/10
[58] Field of Search ............ 260/2.5 AF, 2.5 BD, 260/2.5 AN, 2.5 AV; 264/51, 64

[56] References Cited
UNITED STATES PATENTS

| | | | |
|---|---|---|---|
| 3,585,185 | 6/1971 | Levis et al. | 260/210 |
| 3,188,296 | 6/1965 | Hoppe | 260/2.5 BD |
| 3,108,976 | 10/1963 | Knox | 260/2.5 AF |
| 3,459,733 | 8/1969 | Byrd | 260/2.5 AN |
| 3,502,601 | 3/1970 | Case | 260/2.5 AN |
| 3,455,886 | 7/1969 | Versnel | 260/2.5 AN |
| 3,574,167 | 4/1971 | Case | 260/2.5 AV |
| 3,639,542 | 2/1972 | Pizzini | 260/952 |
| 3,639,541 | 2/1972 | Austin | 260/952 |

FOREIGN PATENTS OR APPLICATIONS

| | | | |
|---|---|---|---|
| 1,009,007 | 11/1965 | Great Britain | 260/2.5 BD |
| 822,546 | 10/1959 | Great Britain | 260/2.5 AF |
| 803,771 | 10/1958 | Great Britain | 260/2.5 AF |
| 1,567,202 | 5/1969 | France | |

*Primary Examiner*—Donald E. Czaja
*Assistant Examiner*—C. Warren Ivy
*Attorney*—Griswold & Burdick, Raymond B. Ledlie and James G. Carter

[57] ABSTRACT

Air blown polyurethane foams having densities below 15 lbs/ft$^3$ are prepared from ester-modified polyether polyols, a polyisocyanate and a catalyst for urethane formation, in the absence of a cell control agent.

8 Claims, No Drawings

AIR BLOWN POLYURETHANE FOAMS

This invention relates to polyurethane foams and more particularly relates to air blown polyurethane foams and a process for preparing them.

Polyurethane foams are well known, as is methods for their preparation. In general, the reactants, a polyhydroxyl containing compound such as a polyether polyol or a polyester polyol and a polyisocyanate are reacted together in the presence of a suitable catalyst, a cell control agent or surfactant and a foaming agent such as a low boiling hydrocarbon or halohydrocarbon, or water which reacts with the isocyanate producing $CO_2$ which provides the gas for blowing.

It has now been unexpectedly discovered that a polyurethane foam having densities less than about 15 lbs/cu. ft. and possessing good physical properties can be prepared without the use of a blowing agent and a cell regulator or surfactant by employing an ester-modified polyether polyol.

The polyurethane foams of the present invention comprise (1) an active hydrogen containing composition comprising from 50 to 100 parts by weight and preferably 80 to 95 parts by weight of an ester-modified polyether polyol and 0 to 50 parts by weight and preferably from 5 to 20 parts by weight of an aromatic amine, a glycol, a polyether polyol or a polyester polyol or mixtures thereof, (2) a polyisocyanate in such quantities so as to provide from about 0.85 to about 2.0 and preferably from about 1.0 to about 1.2 NCO equivalents per hydroxyl equivalent contained in (1), and (3) a catalyst for urethane formation.

The polyurethane foams of the present invention are prepared by mechanically inducing air into a mixture comprising (1) an active hydrogen containing composition, (2) a polyisocyanate and (3) a catalyst for urethane formation.

By the term air it is meant any gaseous element, compound or mixture thereof which exist in the gaseous state at standard conditions of temperature and pressure i.e. 25°C and 1 atmosphere. Suitable such compounds include, for example, propane, methane, ethane, nitrogen, carbon dioxide, helium, xenon, oxygen, mixtures thereof such as for example, air and the like.

The foams of the present invention, unlike the polyurethane foams of the prior art, do not require (1) a foaming or blowing agent or (2) a cell regulator or cell control agent or surfactant. Not only do the foams of the present invention not require a cell control agent, but their use is detrimental to the resultant foam in that they shrink, i.e. collapse in the center upon curing.

The foaming is accomplished by mechanically inducing air into the foam composition. This can readily be accomplished by a mixer such as a hand kitchen mixer fitted with a blade designed to mechanically whip or blend air into the components being mixed such as the type for preparing whipping cream or for preparing meringue from egg whites and the like. Another method, which is more readily adaptable to large scale production is by feeding a stream composed of a mixture of the ingredients of the foam composition and a stream of air into a suitable froth generator-mixer such as an Oakes foamer whereupon the frothed composition emerges from the exit of the Oakes foamer and may be directed onto or into a suitable container such as a moving conveyor, a mold or a moving substrate such as carpet, paper, synthetic and natural textile fabrics and the like and thereafter cured at room or elevated temperatures.

The ester-modified polyether polyols employed in the preparation of the novel polyurethane foams of the present invention may be represented by the general formula

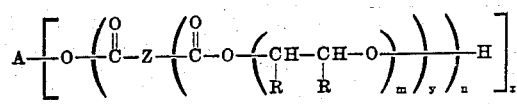

wherein A is the residue of an initiator or starting compound having from about two to about eight preferably two to about four active hydrogen atoms and an active hydrogen equivalent weight of from about 27 to about 2,500 and preferably from about 400 to about 2,500, Z is the residue of an iternal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from one to 20 carbon atoms, a halomethyl radical, a phenyl radical, a phenoxymethyl radical, and an alkoxymethyl radical, with the proviso that one of the R substituents must be hydrogen, $m$ has an average value of from about 1.0 to about 2.0, $n$ has a value from about 1 to about 5, $x$ has a value from about 2 to about 8, preferably 2 to about 4, and $y$ has a value of 1 or 2.

The ester-modified polyether polyols employed in the present invention are prepared by reacting an initiator or starting compound having from two to eight active hydrogen atoms, a polycarboxylic acid anhydride and a vicinal alkylene oxide or substituted vicinal alkylene oxide at a temperature of from about 50° to about 150°C and preferably from about 80° to about 120°C in the absence of a catalyst for from about 4 to about 40 hours and preferably from about 6 to about 24 hours, or at a temperature of from about 40° to about 100°C in the presence of a basic-acting catalyst including, for example, alkali metal hydroxides such as sodium hydroxide or potassium hydroxide and tertiary amines such as triethyl amine or trimethyl amine and the like for a period of from about 3 to about 24 hours and preferably from about 4 to about 8 hours and subsequently recovering the desired ester-modified polyether polyol.

An alternate method for preparing the ester-modified polyether polyols employed in the present invention is to react the initiator or starting compound with the polycarboxylic acid anhydride at a temperature of from about 50° to about 150°C and preferably from about 80° to about 120°C for from about 1 to about 4 hours, preferably from about 2 to about 3 hours, and then slowly adding the vicinal alkylene oxide while maintaining the temperature within the above range for from about 1 to about 24 hours in the absence of a catalyst. The reaction is complete in about 1 to about 8 hours in the presence of a basic-acting catalyst.

In either of the two processes mentioned aboe, it is usually preferred to conduct the reaction in the absence of a catalyst, however in certain instances, such as when the alkylene oxide employed is an olefin oxide of greater than three carbon atoms which react in a sluggish manner, it is preferred to conduct the reaction in the presence of a basic-acting catalyst.

In the first of the above mentioned processes, the quantity of polycarboxylic acid anhydride employed is in the range of from about 0.3 moles to about 5 moles of anhydride per active hydrogen contained in the initiator and the quantity of vicinal alkylene oxide employed is in the range of from about 1.5 moles to about 15 moles of alkylene oxide per mole of anhydride employed. In this process, an anhydride molecule reacts with an active hydrogen of the initiator and then an average of from about 1.5 to about 2.0 moles of the alkylene oxide reacts with the carboxyl group produced from the reaction of the anhydride with the active hydrogen. When more than one mole of anhydride per active hydrogen is employed, each active hydrogen reacts with 1 mole of anhydride and each resultant carboxyl group reacts with an average of from about 1.5 to about 2.0 moles of alkylene oxide and the remaining quantities of anhydride and alkylene oxide react by the same procedure in the same order onto the thus formed ester-modified polyol thereby forming a different ester-modified polyol. The excess alkylene oxide is then conveniently removed by any of the well-known methods such as, for example, evaporation under reduced pressure, purging with inert gas and the like.

In the second mentioned process, each step is carried out independently, i.e. the anhydride is added to the initiator and upon completion of the reaction, the alkylene oxide is slowly added. Then, if desired, additional quantities of acid anhydride is reacted followed by the addition of the alkylene oxide until the desired product is obtained.

From the above discussion it is easy to visualize that the first mentioned method is much preferred to the latter method.

Suitable initiators or starting compounds which may be employed are those compounds containing from about two to about eight active hydrogen atoms and include such compounds as diols, triols, tetrols, pentols, hexols, octols and their polyoxyalkylene derivatives prepared by reacting a diol such as, for example, propylene glycol, ethylene glycol, neopentyl glycol, dibromoneopentylglycol, butylene glycol, 1,6-hexane diol and the like, or a triol such as, for example, glycerine, trimethylolpropane, 1-2-6-hexanetriol and the like or a compound containing four active hydrogen atoms such as, for example, pentaerythritol, diglycerol, ethylene diamine, aminoethylethanolamine, hextiol, sucrose, heptitol, and the like, or mixtures of such compounds with a vicinal alkylene oxide such as, for example, ethylene oxide, 1,2-propylene oxide, 1,2-butylene oxide, 2,3-butylene oxide, epihalohydrins such as, for example epichlorohydrin, epiiodohydrin and epibromohydrin, mixtures of any of the above and the like. The term vicinal alkylene oxide also includes monoglycidyl ethers including aromatic glycidyl ethers such as, for example cresyl glycidyl ether, phenyl glycidyl ether, aliphatic glycidyl ethers such as, for example, butyl glycidyl ether, propyl glycidyl ether, and the like.

The quantity of vicinal alkylene oxide reacted with the active hydrogen-containing compound is such that the resultant polyoxyalkylene starting compound or initiator has an active hydrogen equivalent weight of from about 27 to about 2,500 and preferably from about 400 to about 2,000.

Suitable alkylene oxides which may be reacted in conjunction with the acid anhydride with the above described initiators or starter compounds to prepare the novel ester containing polyether polyols of this ivention include the vicinal alkylene oxides such as ethylene oxide, 1,2-propylene oxide, 1,2-butylene oxide, epihalohydrins such as epichlorohydrin, epibromohydrin and epiiodohydrin, monoglycidyl ethers including aliphatic glycidyl ethers such as, for example, butyl glycidyl ether, propyl glycidyl ether and the like, aromatic glycidyl ethers such as, for example, phenyl glycidyl ether, cresyl glycidyl ether and the like, and mixtures of any of the above.

Suitable internal anhydrides of polycarboxylic acids which may be employed include saturated acyclic aliphatic anhydrides such as, for example, succinic anhydride, glutaric anhydride, adiphic anhydride and the lie, unsaturated acyclic aliphatic anhydrides such as, for example, maleic anhydride, itaconic anhydride, citraconic anhydride and the like; saturated and unsaturated cyclic aliphatic anhydrides such as, for example, 1,2-cyclohexane-dicarboxylic anhydride and cis-4-cyclohexene-1,2-dicarboxylic anhydride; aromatic anhydrides such as, for example, phthalic anhydride, naphthalic anhydride, hemimellitic anhydride, prehnitic anhydride, diphenic anhydride, trimellitic anhydride and the like; and halogen-containing dicarboxylic acid anhydrides such as, for example, chlorendic anhydride, tetrachlorophthalic anhydride, tetrabromophthalic anhydride and the like. Mixtures of any of the above internal anhydrides of a dicarboxylic acid may also be employed.

The ester-modified polyether polyols employed in the present invention are more fully described in a copending application Ser. No. 67,233 entitled "ESTER MODIFIED POLYETHER POLYOLS" by Robert W. McAda, Jr. filed on Aug. 26, 1970 now abandoned.

Suitable glycols which may be employed in admixture with the ester-modified polyether polyols include those having from two to 10 carbon atoms such as ethylene glycol, propylene glycol, butylene glycol, dihydroxydecane and the like and dimers, trimers, tetramers thereof and the like such as for example diethylene glycol, dipropylene glycol, triethyleneglycol, tripropylene glycol, dibutylene glycol, tributylene glycol and the like.

Suitable polyether polyols which may be employed in admixture with the ester-modified polyether polyols include those prepared by reacting an initiator compound having from two to eight hydroxyl groups with a vicinal epoxide containing compound.

The initiator compounds which may be employed in the preparation of the said polyether polyols may be selected from the same group as those employed in preparing the starting compounds for the ester-modified polyether polyols.

Suitable vicinal epoxide containing compounds include those employed in the preparation of the starting compounds for the ester-modified polyether polyols such as, for example, ethylene oxide, 1,2-propylene oxide, 1,2butylene oxide, epichlorohydrin and the like.

Suitable aromatic amines which may be employed in admixture with the ester-modified polyether polyols include 4,4'-methylene-bis-(2-chloroaniline) and other aromatic amine elastomer curatives such as LD-813, commercially available from E. I. duPont, p-phenylene diamine, methylene-bis(2-methoxyaniline), tolidine, dianisidine, 3,3'-dichlorobenzidine and the like.

The polyisocyanates which may be employed to prepare the polyurethane foams of the present invention are any organic polyisocyanate having two or more NCO groups per molecule and no other substituents capable of reacting with the hydroxyl groups of the ester-containing polyether polyol. Suitable polyisocyanates include, for example, 2,4-toluenediisocyanate, 2,6-toluenediisocyanate, hexamethylene diisocyanate, p,p′-diphenylmethanediisocyanate, p-phenylene diisocyanate, naphthalene diisocyanate, dianisidine diisocyanate, polymethylene polyphenylisocyanate, mixtures of one or more polyisocyanates and the like.

Suitable catalysts for promoting urethane formation which may be employed in the foam formulation include, for example, tertiary amines of which tetramethylbutanediamine, triethylenediamine and N-ethylmorpholine are examples. Other catalysts which may be employed in the preparation of the polyurethane foams of the present invention include, for example, lead naphthenate, zinc naphthenate, aluminum distearate, aluminum tristearate, plumbous stearate, plumbous stearate (basic), stannous octoate, stannous oleate, dibutyl tin dilaurate, aluminum mono-stearate, zinc stearate, cadmium stearate, silver acetate, lead pelargonate, phenylmercuric acetate, mixtures thereof, and the like. These catalysts are disclosed more fully in U.S. Pat. No. 3,391,091.

In addition to the active hydrogen-containing component, polyisocyanate and catalyst, the polyurethane foam formulation of the present invention may contain fillers, fire retardant agents and the like.

Suitable fillers include, for example, barium sulfate, calcium carbonate, mixtures thereof, and the like.

When it is desired to prepare polyurethane foams having fire retardant properties, fire retardant compounds maybe added to the foam formulation. Suitable such fire retardant compounds include phosphorous-containing compounds including, for example, tricresyl phosphate and the like, halogenated phosphates including, for example, tris (dichloropropyl)phosphate, tris(2,3-dibromopropyl) phosphate and the like, halogenated phosphonates including, for example, bis(3-bromopropyl) 3-bromopropane phosphonate and the like, halogenated glycols including, for example, dibromoneopentylglycol and the like, inorganic salts including, for example, magnesium ammonium phosphate, ammonium bromide, calcium phosphate and the like, and mixtures of any of the above compounds.

Although the use of a blowing agent is not essential to the preparation of the polyurethane foams of the present invention, in some instances it may be desired to employ minor amounts, about 1 to about 20 parts by weight per hundred parts of the active hydrogen containing component of a blowing agent such as a volatile organic liquid having a boiling point below about 110°C such as for example, halohydrocarbons such as methylene chloride, monofluorotrichloromethane and the like or from about 0.1 to about 5 parts by weight of water per hundred parts of the active hydrogen-containing component. The volatile hydrocarbon blowing agents are more fully described in U.S. Pat. No. 3,072,582.

The following examples are illustrative of the present invention but are not to be construed as to limiting the scope thereof in any manner.

EXAMPLES 1–18 AND COMPARATIVE EXPERIMENTS 1–4

In the following examples and experiments, the ester-modified polyether polyol or a mixture of such with a polyhydroxyl containing compound and the polyisocyanate were placed into a Hobart mixer equipped with a blade for whipping air into said mixture and whipped for about 2 minutes at high speed. After the whipping was completed, the catalyst, a 33 percent solution of triethylene-diamine in dipropylene glycol was added and the resultant froth mixed for an additional 45.0 seconds and then poured into an open container to cure.

The quantities and type of polyols and polyisocyanates employed and the properties of the foam are given in the following table.

TABLE

| Experiment | 1 | 2 | 3 | 4 | 5 | 6 | 7 | 8 |
|---|---|---|---|---|---|---|---|---|
| Ester-modified polyether polyol: | | | | | | | | |
| Type | [1] A | A | A | A | A | A | [2] B | [3] C |
| Grams | 270 | 270 | 270 | 255 | 255 | 270 | 270 | 270 |
| Active hydrogen-containing compound: | | | | | | | | |
| Type | [9] RB-340 | [10] RN-490 | [11] DEG | DEG/RN-490 | DEG/RB-340 | RN-490 | DEG | DEG |
| Grams | 30 | 30 | 30 | 15/30 | 15/30 | 30 | 30 | 30 |
| Polyisocyanate: | | | | | | | | |
| NCO index | 105 | 105 | 110 | 110 | 100 | 110 | 120 | 120 |
| Type | [12] TDI | TDI | TDI | TDI | [13] MT-40 | TDI | TDI | TDI |
| Grams | 35.8 | 39.75 | 71.0 | 68.1 | 82.15 | 41.8 | 73.7 | 78.6 |
| Triethylene diamine, grams of soln | 3.0 | 3.0 | 3.0 | 3.0 | 3.0 | 3.0 | 3.0 | 3.0 |
| Water, grams | 0 | 0 | 0 | 0 | 0 | 0 | 0 | 0 |
| CFCl$_3$, grams | 0 | 0 | 0 | 0 | 0 | 0 | 0 | 0 |
| GE 1066 [14] | 0 | 0 | 0 | 0 | 0 | 0 | 0 | 0 |
| DC 192 [15] | 0 | 0 | 0 | 0 | 0 | 0 | 0 | 0 |
| Fyrol®HB-32 [21] | 0 | 0 | 0 | 0 | 0 | 30 | 0 | 0 |
| Density, lbs./ft.$^3$ | 13.06 | 12.46 | 11.98 | 8.69 | 15.6 | 11.55 | 12.77 | 8.63 |
| Tear resistance, lbs./in | 0.93 | 1.0 | 5.7 | 1.4 | 2.8 | 0.60 | N.D. | N.D. |
| Compression set (50%) | 2.4 | 1.5 | 50.0 | 1.3 | 1.4 | 0.60 | N.D. | N.D. |
| Compression load deflection (CLD): | | | | | | | | |
| 25% | 1.50 | 1.26 | 0.72 | 1.15 | 5.63 | 1.31 | N.D. | N.D. |
| 50% | 2.44 | 2.07 | 1.38 | 1.93 | 10.87 | 2.17 | N.D. | N.D. |
| 65% | 4.35 | 3.72 | | 3.50 | 21.22 | 3.93 | N.D. | N.D. |
| Return to 25% | 1.41 | 1.19 | 0.00 | 1.00 | 5.05 | 1.25 | N.D. | N.D. |
| Percent hysteresis return | 94 | 94 | 0 | 87 | 90 | 95 | N.D. | N.D. |
| Modulus (25%/65% CLD) | 2.90 | 2.95 | 3.78 | 3.04 | 3.77 | 3.0 | N.D. | N.D. |

TABLE.—Continued

| Experiment | 9 | 10 | 11 | 12 | 13 | 14 | 15 | 16 | 17 | 18 |
|---|---|---|---|---|---|---|---|---|---|---|
| Ester-modified polyether polyol: | | | | | | | | | | |
| Type | [4] D | A | A | [5] E | E | [6] F | [16] I | I | [18] J | [19] K |
| Grams | 270 | 270 | 285 | 270 | 270 | 270 | 150 | 200 | 300 | 100 |
| Active hydrogen-containing compound: | | | | | | | | | | |
| Type | DEG | DEG | DEG | DEG | DEG | DEG | [1] RN-600 | None | None | None |
| Grams | 30 | 30 | 15 | 30 | 30 | 30 | 150 | None | None | None |

TABLE.—Continued

| Experiment | 9 | 10 | 11 | 12 | 13 | 14 | 15 | 16 | 17 | 18 |
|---|---|---|---|---|---|---|---|---|---|---|
| Polyisocyanate | | | | | | | | | | |
| NCO index | 120 | 120 | 120 | 120 | 120 | 120 | 120 | 120 | 120 | 120 |
| Type | TDI | TDI | TDI | TDI | TDI | TDI | [20] PAPI | TDI | TDI | TDI |
| Grams | 80.0 | 111.0 | 82.5 | 76.3 | 76.3 | 71.5 | 290 | 84.6 | 77.5 | 36.5 |
| Triethylene diamine, grams of soln | 3.0 | 3.0 | 3.0 | 3.0 | 3.0 | 3.0 | 3.0 | 2.0 | *3.9 | 0.5 |
| Water, grams | 0 | 3.0 | 3.0 | 0 | 0 | 0 | 0 | 0 | 0 | 0 |
| CFCl₃, grams | 0 | 0 | 0 | 0 | 15 | 0 | 0 | 0 | 0 | 0 |
| GE 1066 [14] | 0 | 0 | 0 | 0 | 0 | 0 | 0 | 0 | 0 | 0 |
| DC 192 [15] | 0 | 0 | 0 | 0 | 0 | 0 | 0 | 0 | 0 | 0 |
| Fyrol® HB-32 [21] | 0 | 0 | 0 | 0 | 0 | 0 | 0 | 0 | 0 | 0 |
| Density, lbs./ft³ | 8.66 | 5.0 | 5.0 | 11.0 | 9.0 | 12.0 | 7.6 | 7.6 | 11.4 | 15.0 |
| Tear resistance, lbs./in | N.D. | N.D. | N.D. | N.D. | N.D. | N.D. | N.D. | N.D. | N.D. | N.D. |
| Compression set (50 percent) | N.D. | N.D. | N.D. | N.D. | N.D. | N.D. | N.D. | N.D. | N.D. | N.D. |
| Compression load deflection (CLD): | | | | | | | | | | |
| 25% | N.D. | N.D. | N.D. | N.D. | N.D. | N.D. | N.D. | N.D. | N.D. | N.D. |
| 50% | N.D. | N.D | N.D. | N.D. | N.D. | N.D. | N.D. | N.D. | N.D. | N.D. |
| 65% | N.D. | N.D. | N.D. | N.D. | N.D. | N.D. | N.D. | N.D. | N.D. | N.D. |
| Return to 25% | N.D. | N.D. | N.D. | N.D. | N.D. | N.D. | N.D. | N.D. | N.D. | N.D. |
| Percent hysteresis return | N.D. | N.D. | N.D. | N.D. | N.D. | N.D. | N.D. | N.D. | N.D. | N.D. |
| Modulus (25%/65% CLD) | N.D. | N.D. | N.D. | N.D. | N.D. | N.D. | N.D. | N.D. | N.D. | N.D. |

| Comparative Experiment | 1 | 2 | 3 | 4 |
|---|---|---|---|---|
| Ester-modifier polyether polyol | | | | |
| Type | [7] G | [8] H | A | A |
| Grams | 270 | 270 | 270 | 270 |
| Active hydrogen-containing compound: | | | | |
| Type | DEG | DEG | DEG | DEG |
| Grams | 30 | 30 | 30 | 30 |
| Polyisocyanate: | | | | |
| NCO index | 105 | 120 | 120 | 120 |
| Type | TDI | TDI | TDI | TDI |
| Grams | 61.4 | 85.8 | 76.3 | 76.3 |
| Triethylene diamine, grams of soln | 3.0 | 3.0 | 3.0 | 3.0 |
| Water, grams | 0 | 0 | 0 | 0 |
| CFCl₃, grams | 0 | 0 | 0 | 0 |
| GE 1066 [14] | 0 | 0 | 0 | 1.5 |
| DC 192 [15] | 0 | 0 | 0.3 | 0 |
| Fyrol® HB-32 [21] | 0 | 0 | 0 | 0 |
| Density, lbs./ft³ | 30 | 17 | Foam shrank upon curing | |
| Tear resistance, lbs./in | N.D. | N.D. | Foam shrank upon curing | |
| Compression set (50%) | N.D. | N.D. | Foam shrank upon curing | |
| Compression load deflection (CLD): | | | | |
| 25% | N.D. | N.D. | Foam shrank upon curing | |
| 50% | N.D. | N.D. | Foam shrank upon curing | |
| 65% | N.D. | N.D. | Foam shrank upon curing | |
| Return to 25% | N.D. | N.D. | Foam shrank upon curing | |
| Percent hysteresis return | N.D. | N.D. | Foam shrank upon curing | |
| Modulus (25%/65% CLD) | N.D. | N.D. | Foam shrank upon curing | |

[1] Ester-modified polyether polyol A is the reaction products of a glycerine initiated polyoxypropylene glycol end capped with ethylene oxide having an OH equivalent weight of about 1,664 with 3 moles of maleic anhydride and 6 moles of ethylene oxide, the resultant product having an OH equivalent weight of about 1,847.

[2] Ester-modified polyether polyol B is the reaction product of a glycerine initiated polyoxypropylene glycol end-capped with ethylene oxide having an OH No. of about 33.7 with 3 moles of maleic anhydride and 6 moles of ethylene oxide having an OH No. of about 22.7.

[3] Ester-modified polyether polyol C is the reaction product of a glycerine initiated polyoxypropylene glycol end capped with ethylene oxide having an OH No. of about 33.7 with 3 moles of phthalic anhydride and 6 moles of ethylene oxide having an OH No. of about 32.65.

[4] Ester-modified polyether polyol D is the reaction product of a glycerine initiated polyoxypropylene glycol end capped with ethylene oxide having an OH No. of about 33.7 with 3 moles of succinic anhydride and 6 moles of ethylene oxide having an OH No. of about 37.

[5] Ester-modified polyether polyol E is the reaction product of a glycerine initiated polyoxypropylene glycol end capped with ethylene oxide having an OH equivalent weight of about 1,636 with 3 moles of maleic anhydride and 6 moles of ethylene oxide having an OH equivalent weight of about 1,635.

[6] Ester-modified polyether polyol F is the reaction product of a glycerine initiated polyoxypropylene glycol end capped with ethylene oxide having an OH equivalent weight of about 2,300 with 3 moles of maleic anhydride and 6 moles of ethylene oxide having an OH equivalent weight of about 2,267.

[7] Polyether polyol G is a glycerine initiated polyoxypropylene glycol end capped with ethylene oxide having an OH equivalent weight of about 1,500.

[8] Polyester polyol H is Fomrez® 50, a commercially available glycol-adipate polyester resin from Witco Chemical Co. having a hydroxyl number in the range 50-55.

[9] A blend of polyhydroxyl initiated polypropylene glycols having an average hydroxyl functionality of about 7.3 and an OH number of 330-350 commercially available as Voranol® RB-340 from The Dow Chemical Co.

[10] A blend of polyfunctional initiators reacted with propylene oxide having an average hydroxyl functionality of about 4.2 and an OH number of 480-500 commercially available as Voranol® RN-490 from The Dow Chemical Co.

[11] DEG is diethylene glycol.

[12] A commercial mixture (80/20 of the 2,4- and 2,6-isomers) of toluene diisocyanate.

[13] A polyisocyanate having an average functionality of about 2.3 and an NCO equivalent weight of about 105 commercially available as Mondur® MT-40 from Mobay Chemical Co.

[14] GE-1066 is silicone cell control agent commercially available from General Electric Co.

[15] DC 192 is a silicone cell control agent commercially available from Dow Corning Corp.

[16] Ester-modified polyether polyol I is the reaction product of trimethylolpropane with 3 moles of maleic anhydride and 6 moles of propylene oxide per mole of trimethylol propane.

[17] Voranol® RN-600 is a polyfunctional polyol having a functionality of about 4.4 and a hydroxyl number of about 561-594.

[18] Ester-modified polyether polyol J is the reaction product of an ethylene oxide end-capped glycerine initiated polyoxypropylene glycol (OH eq. wt.=1,604) with 3 moles of maleic anhydride and 6 moles of ethylene-oxide (OH eq. wt.=1,750).

[19] Ester modified polyether polyol K is a 287 equivalent weight reaction product of 4 moles of maleic anhydride and 8 moles of propylene oxide with the reaction product of aminoethylethanolamine with 3 moles of propylene oxide.

[20] PAPI® is a commercially available polymethylene polyphenyl isocyanate having an average functionality of about 2.7 and an NCO equivalent weight of about 132.

[21] Fyrol® HB-32 is a commercially available fire retardant agent also known as tris(2,3-dibromopropyl) phosphate.

*Stannous octoate (T-9 commercially available from M & T Chem. Co.) was employed instead of triethylenediamine.

We claim:

1. A polyurethane foam resulting from curing a composition which has been frothed by mechanically inducing into such composition a compound which is in the gaseous state at standard temperature and pressure, said composition being void of a cell control agent and which comprises:

1. an active hydrogen-containing composition comprising a. from about 50 to about 100 parts by weight of an ester-modified polyetherpolyol having the general formula

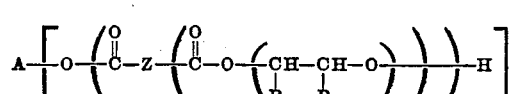

wherein A is the residue of an initiator having from about two to about eight active hydrogen atoms and an active hydrogen equivalent weight of from about 27 to about 2,500, Z is the residue of an internal anhydride selected from the group consisting of a saturated or unsaturated acyclic aliphatic polycarboxylic acid, a saturated or unsaturated cyclic aliphatic polycarboxylic acid, an aromatic polycarboxylic acid and halogenated polycarboxylic acids and mixtures thereof, each R is a substituent independently selected from hydrogen atoms, an alkyl radical having from one to 20 carbon atoms, a halomethyl radical, a phenyl radical, a phenoxymethyl radical, and an alkoxymethyl radical with the proviso that one of the R substituents must be hydrogen, $m$ has an average value of from about 1.0 to about 2.0, $n$ has a value from about 1 to about 5, $x$ has a value from about 2 to about 8 and $y$ has a value of 1 with the proviso that $y$ has a value of 2 when Z is the residue of an aromatic tricarboxylic acid, b. from about 0 to about 50 parts by weight of an aromatic amine, a glycol, a polyether polyol, a polyester polyol, or a mixture thereof, 2. a polyisocyanate in a quantity so as to provide from about 0.85 to about 2.0 NCO groups per active hydrogen atom in (1), and 3. a catalyst for urethane formation.

2. The composition of claim 1 wherein the quantity of (1a) is from about 80 to about 95 parts by weight and (1b) is from about 5 to about 20 parts by weight, the quantity of (2) is from about 1.0 to about 1.2 NCO equivalents per active hydrogen equivalent in (1).

3. The composition of claim 2 wherein said residue of an initiator A has an active hydrogen equivalent weight of from about 400 to about 2,500 and a functionality of from about 2 to about 4.

4. The composition of claim 3 wherein Z is the residue of maleic anhydride, phthalic anhydride and suicinic anhydride.

5. The composition of claim 4 wherein the polyisocyanate component (2) is toluene diisocyanate.

6. The composition of claim 5 wherein component 1b is diethylene glycol.

7. A process for preparing polyurethane foams which comprises mechanically inducing a compound which is in the gaseous state at standard temperature and pressure, in the absence of a cell control agent, into a mixture comprising 1. an active hydrogen containing composition comprising a. from about 50 to about 100 parts by weight of an ester-modified polyetherpolyol having the general formula

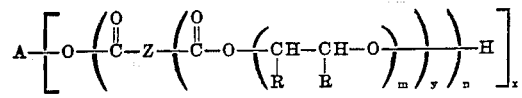

wherein A is the residue of an initiator having from about two to about eight active hydrogen atoms and an active hydrogen equivalent weight of from about 27 to about 2500, Z is the residue of an internal anhydride selected from the group consisting of a saturated or unsaturated acyclic aliphatic polycarboxylic acid, a saturated or unsaturated cyclic aliphatic polycarboxylic acid, an aromatic polycarboxylic acid and halogenated polycarboxylic acids and mixtures thereof, each R is a substituent independently selected from hydrogen atoms, an alkyl radical having from one to 20 carbon atoms, a halomethyl radical, a phenyl radical, a phenoxymethyl radical, and an alkoxymethyl radical with the proviso that one of the R substituents must be hydrogen, $m$ has an average value of from about 1.0 to about 2.0, $n$ has a value from about 1 to about 5, $x$ has a value from about two to about eight and $y$ has a value of 1 with the proviso that $y$ has a value of 2 when Z is the residue of an aromatic tricarboxylic acid, b. from about 0 to about 50 parts by weight of an aromatic amine, a glycol, a polyether polyol, a polyester polyol, or a mixture thereof, 2. a polyisocyanate, and 3. a catalyst for urethane formation, thereby producing a froth which is dispensed into a suitable container.

8. The process of claim 7 wherein the quantity of (a) is from about 80 to about 95 parts by weight and (b) is from about 5 to about 20 parts by weight, the quantity of (2) is from about 1.0 to about 1.2 NCO equivalents per active hydrogen equivalent in (1).

* * * * *

PO-1050
(5/69)

UNITED STATES PATENT OFFICE
CERTIFICATE OF CORRECTION

Patent No. 3,755,212       Dated Aug. 28, 1973

Inventor(s) James R. Dunlap and Donald B. Parrish

It is certified that error appears in the above-identified patent and that said Letters Patent are hereby corrected as shown below:

Col. 2, line 18, change "iternal" to --internal--.

Col. 2, line 61, change "aboe" to --above--.

Col. 3, line 47, change "hextiol" to --hexitol--.

Col. 4, line 14, change "adiphic" to --adipic--.

Col. 4, line 15, change "lie" to --like--.

Col. 4, line 58, change "1,2butylene oxide" to 1,2-butylene oxide--.

Col. 5, line 35, change "maybe" to --may be--.

Col. 5 and 6 in the Table opposite NCO index under Experiment 5, change "100" to --110--.

Col. 5 and 6 in the Table opposite Active hydrogen-containing compound, type under Experiment 15, change the footnote "1" to --17--.

Col. 7, line 1 of footnote 1, change "products" to --product--.

Signed and sealed this 3rd day of December 1974.

(SEAL)
Attest:

McCOY M. GIBSON JR.
Attesting Officer

C. MARSHALL DANN
Commissioner of Patents